United States Patent
Tsuda et al.

(10) Patent No.: US 10,087,868 B2
(45) Date of Patent: Oct. 2, 2018

(54) ABNORMALITY DETECTOR OF TURBO-CHARGED ENGINE

(71) Applicant: Mazda Motor Corporation, Aki-gun, Hiroshima (JP)

(72) Inventors: Amane Tsuda, Hatsukaichi (JP); Hiroaki Deguchi, Hiroshima (JP); Kenjiro Konomi, Hiroshima (JP); Nobuo Yunoki, Aki-gun (JP); Yasushi Niwa, Higashihiroshima (JP); Kazuya Niida, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 85 days.

(21) Appl. No.: 15/129,562

(22) PCT Filed: Feb. 18, 2015

(86) PCT No.: PCT/JP2015/000769
§ 371 (c)(1),
(2) Date: Sep. 27, 2016

(87) PCT Pub. No.: WO2015/145955
PCT Pub. Date: Oct. 1, 2015

(65) Prior Publication Data
US 2017/0138291 A1 May 18, 2017

(30) Foreign Application Priority Data
Mar. 28, 2014 (JP) .................. 2014-069615

(51) Int. Cl.
*F02D 41/22* (2006.01)
*F02B 39/16* (2006.01)
*F02D 41/00* (2006.01)

(52) U.S. Cl.
CPC ............ *F02D 41/221* (2013.01); *F02B 39/16* (2013.01); *F02D 41/0007* (2013.01); *Y02T 10/144* (2013.01)

(58) Field of Classification Search
CPC .... F02D 41/221; F02D 41/0007; F02B 39/16; Y02T 10/144
(Continued)

(56) References Cited

U.S. PATENT DOCUMENTS

| 4,498,443 A | * | 2/1985 | Hasegawa | ............... F02D 17/04 |
| | | | | 123/198 DB |
| 4,748,567 A | * | 5/1988 | Sumizawa | ............... F02B 37/18 |
| | | | | 123/479 |

(Continued)

FOREIGN PATENT DOCUMENTS

| CN | 101932809 A | 12/2010 |
| JP | S61157027 A | 7/1986 |

(Continued)

OTHER PUBLICATIONS

ISA Japan Patent Office, International Search Report Issued in Application No. PCT/JP2015/000769, dated Apr. 21, 2015, WIPO, 2 pages.

(Continued)

*Primary Examiner* — Hoang Nguyen
(74) *Attorney, Agent, or Firm* — Alleman Hall Creasman & Tuttle LLP

(57) ABSTRACT

An abnormality detector of a turbocharged engine includes: a compressor including a plurality of blades that are detected portions; and a detecting portion configured to electrically detect the plurality of blades. Each time the blades are detected a predetermined number of times, one pulse having a pulse width corresponding to a measurement time required to detect the blades is output, and a turbo revolution is (Continued)

calculated from the pulse width of the output pulse. When it is judged that a rotation change of the rotating body which change is calculated based on a pulse width of a first pulse and a pulse width of a second pulse output after the first pulse exceeds a predetermined rate in a region where the rotating body exceeds a predetermined revolution, it is determined that an abnormality of the blade or an electromagnetic noise abnormality of the detecting portion occurs.

4 Claims, 6 Drawing Sheets

(58) Field of Classification Search
USPC .......................................... 60/602, 605.1, 611
See application file for complete search history.

(56) References Cited

U.S. PATENT DOCUMENTS

| | | | | |
|---|---|---|---|---|
| 7,779,796 B2* | 8/2010 | Nakamura | ............ | F01L 1/3442 |
| | | | | 123/347 |
| 8,433,499 B2* | 4/2013 | Otsuka | ................... | F02B 37/18 |
| | | | | 60/602 |
| 2004/0182079 A1* | 9/2004 | Akao | ..................... | F02D 41/18 |
| | | | | 60/605.2 |

FOREIGN PATENT DOCUMENTS

| | | |
|---|---|---|
| JP | H06102283 A | 4/1994 |
| JP | H11316120 A | 11/1999 |

OTHER PUBLICATIONS

ISA Japan Patent Office, Written Opinion Issued in Application No. PCT/JP2015/000769, dated Apr. 21, 2015, WIPO, 4 pages.

The Intellectual Property Department of the People's Republic of China, Office Action and Search Report Issued in Chinese Application No. 201580003320.5, Jan. 10, 2018, 7 pages. (Submitted with English Translation of Search Report).

* cited by examiner

ABNORMALITY DETECTOR OF TURBO-CHARGED ENGINE

TECHNICAL FIELD

The present invention relates to an abnormality detector of a turbocharged engine.

BACKGROUND ART

A turbocharged engine mounted on a vehicle requires a technology for detecting abnormalities of a turbine and compressor which are rotating bodies.

One example of an abnormality detector for detecting an abnormality of a measured portion of a conventional rotating body is a crank angle sensor diagnosis device described in PTL 1. PTL1 describes a method of detecting a damage of a tooth of a rotating body by a decrease in the number of pulses between reference signals from a normal number of pulses.

PTL 2 describes a method in which when an abnormality is detected at an interval of a part of a plurality of pulses, it is determined that an abnormality of the tooth of the rotating body occurs.

PTL 3 describes a frequency divider circuit that outputs one pulse each time the frequency divider circuit counts a predetermined number of measurement signals.

CITATION LIST

Patent Literature

PTL 1: Japanese Laid-Open Patent Application Publication No. 11-316120
PTL 2: Japanese Laid-Open Patent Application Publication No. 06-102283
PTL 3: Japanese Laid-Open Patent Application Publication No. 61-157027

SUMMARY OF INVENTION

Technical Problem

In the case of using a small turbocharger, when the output of the turbocharger is high, the turbocharger is used in a high rotation region in the vicinity of an endurance limit. Therefore, it is important to manage and control the revolution of the turbocharger such that the revolution of the turbocharger does not exceed the revolution of the endurance limit. To do this, the revolution of the turbocharger needs to be accurately acquired. For example, one of blades of a compressor impeller is damaged, and detection signals corresponding to the respective blades of the compressor impeller are output. The revolution of the compressor impeller is acquired by directly receiving the detection signals. In this case, an interval of the detection signal corresponding to the damaged blade becomes large, so that the determination that the abnormality occurs can be immediately performed. However, such abnormality detection cannot be performed when, to reduce a load of a central processing unit (CPU) constituting an electronic control unit (ECU), a pulse constituted by a plurality of detection signals corresponding to a plurality of blades is output, that is, when frequency division is performed, in other words, the detection signals are counted a predetermined number of times, and one pulse having a pulse width corresponding to a count time is output after the counting, and the revolution of the compressor is calculated from the pulse width.

The present invention was made in consideration of these circumstances, and an object of the present invention is to provide a technology of, in detection of an abnormality of a rotating body, being able to accurately determine the detection of a rotation abnormality by a damage of the rotating body, an electromagnetic noise abnormality, or the like while reducing a load of a CPU of an electronic control unit.

Solution to Problem

To achieve the above object, the present invention is configured such that: a pulse is obtained by reducing, by frequency division, frequencies of detection signals output from detected portions provided at a rotating body; and an abnormality of the rotating body is detected by an expansion of a pulse width (pulse delay).

Specifically, the present invention is directed to an abnormality detector of a turbocharged engine and provides the following solutions.

To be specific, a first aspect of the present invention is directed to an abnormality detector of a turbocharged engine, the abnormality detector including: a rotating body including a plurality of blades that are detected portions; and a detecting portion configured to electrically detect the detected portions, wherein: each time the detected portions are detected a predetermined number of times, one pulse having a pulse width corresponding to a measurement time required to detect the detected portions the predetermined number of times is output; a revolution of the rotating body is calculated from the pulse width of the output pulse; and when it is judged that a rotation change of the rotating body which change is calculated based on a pulse width of a first pulse and a pulse width of a second pulse output after the first pulse exceeds a predetermined rate in a region where the revolution of the rotating body exceeds a predetermined revolution, it is determined that an abnormality of the blade or an electromagnetic noise abnormality of the detecting portion occurs.

According to this, each time the detected portions are detected a predetermined number of times, one pulse having a pulse width corresponding to a measurement time required to detect the detected portions the predetermined number of times is output, and the revolution of the rotating body is calculated from the pulse width of the output pulse. When it is judged that the rotation change of the rotating body which change is calculated based on the pulse width of the first pulse and the pulse width of the second pulse output after the first pulse exceeds the predetermined rate (change rate) in the region where the revolution of the rotating body exceeds the predetermined revolution, it is determined that the abnormality of the blade or the electromagnetic noise abnormality of the detecting portion occurs. Therefore, while reducing the load of the CPU of the electronic control unit, the rotation abnormalities by the damage of the blade and the electromagnetic noise abnormality can be accurately detected and determined.

A second aspect of the present invention is configured such that: in the first aspect of the present invention, the rotating body is one of a turbine and a compressor which constitute the turbocharger; when it is judged that the rotation change of the rotating body which change is calculated based on the pulse width of the first pulse and the pulse width of the second pulse exceeds the predetermined rate, and supercharging pressure to the turbocharger decreases below a predetermined value, it is determined that the abnormality of the blade occurs; and when it is judged that the rotation change of the rotating body which change is calculated based on the pulse width of the first pulse and the pulse width of the second pulse exceeds the predetermined rate, and the supercharging pressure does not decrease below the predetermined value, it is determined that the electromagnetic noise abnormality occurs.

According to this, a cause of the detected abnormality can be appropriately determined based on the supercharging pressure.

A third aspect of the present invention is configured such that: in the first or second aspect of the present invention, a judgment that the rotation change of the rotating body which change is calculated based on the pulse width of the first pulse and the pulse width of the second pulse exceeds the predetermined rate is decided when each of rotation changes of the rotating body which changes are calculated based on the pulse width of the first pulse and pulse widths of a plurality of pulses consecutively output after the first pulse exceeds the predetermined rate.

According to this, by performing the determination plural times, the reliability of the detected abnormality can be improved.

A fourth aspect of the present invention is configured such that: in the third aspect of the present invention, when the rotation change of the rotating body which change is calculated based on the pulse width of the first pulse and the pulse width of the second pulse does not exceed the predetermined rate after it is judged that the rotation change of the rotating body which change is calculated based on the pulse width of the first pulse and the pulse width of the second pulse exceeds the predetermined rate, it is determined that the electromagnetic noise abnormality occurs.

According to this, based on the fact that the rotation change of the rotating body which change is calculated based on the pulse width of the first pulse and the pulse width of the second pulse does not exceed the predetermined rate after it is determined that the abnormality occurs, it can be determined that the abnormality is not the damage of the blade but the abnormality caused by the electromagnetic noise.

Advantageous Effects of Invention

According to the present invention, in the detection of the abnormality of the rotating body, the rotation abnormality by the damage of the rotating body, the electromagnetic noise abnormality, or the like can be accurately detected while reducing the load of the CPU of the electronic control unit.

BRIEF DESCRIPTION OF DRAWINGS

FIG. 2A is a schematic graph showing sensor output signals and a pulse waveform obtained after frequency division in a normal case. FIG. 2B is a schematic graph showing sensor output signals and a pulse waveform obtained after frequency division in an abnormal case.

DESCRIPTION OF EMBODIMENTS

Hereinafter, an embodiment of the present invention will be explained in detail based on the drawings. The following explanation of a preferred embodiment is essentially an example and does not intend to limit the present invention, products to which the present invention is applied, or usages of the present invention.

Embodiment

An abnormality detector of a turbocharged engine according to one embodiment of the present invention will be explained in reference to FIG. 1.

Schematic Configuration of Engine Control Device

First, schematic configurations of an engine and a control device of the engine will be explained.

Figure 1:
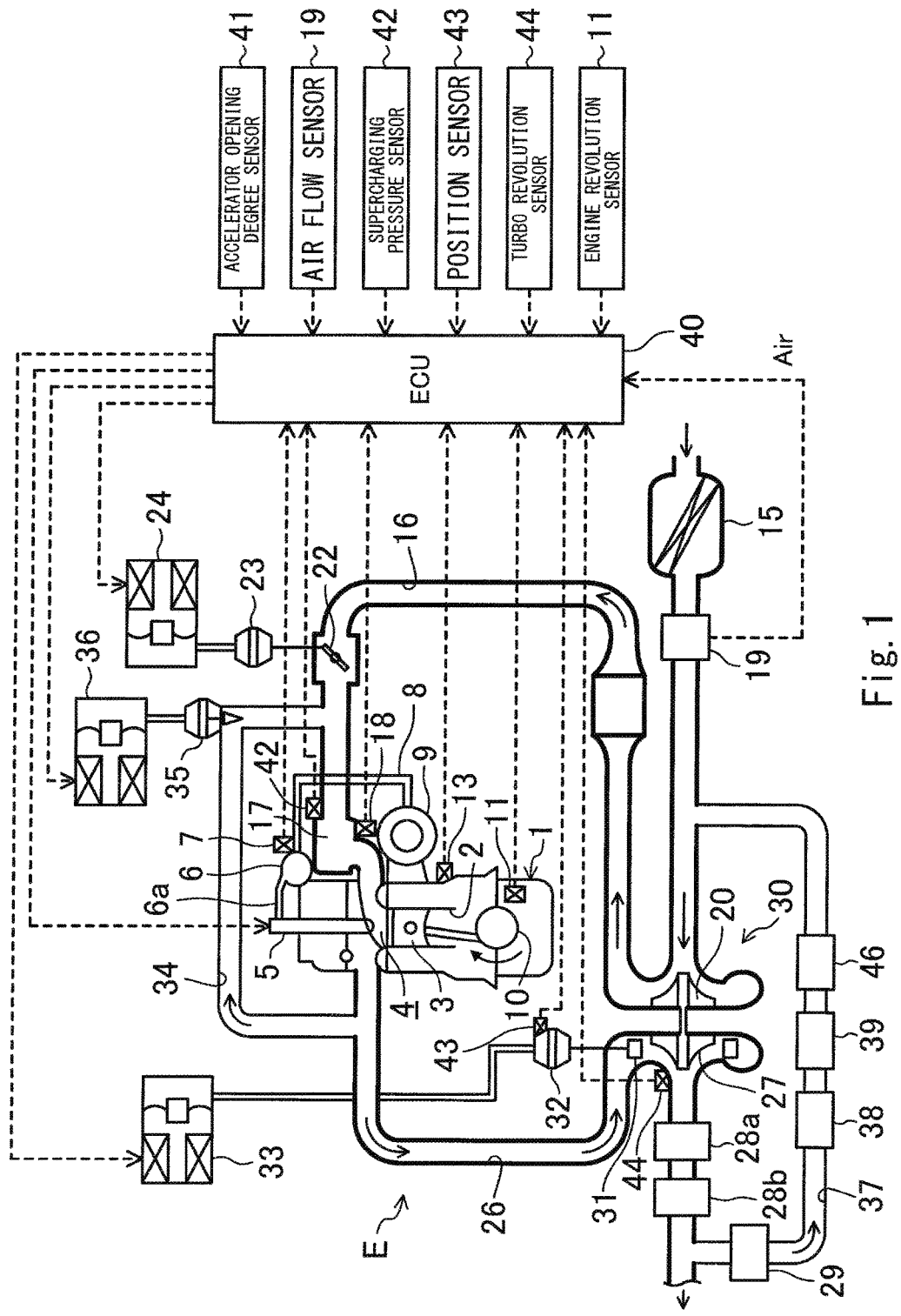
FIG. 1 is a schematic configuration diagram showing an abnormality detector of a turbocharged engine according to one embodiment of the present invention.

FIG. 1 shows entire configurations of the engine and the control device according to one embodiment of the present invention. An engine E is, for example, a direct injection diesel engine. A plurality of cylinders 2 (FIG. 1 shows only one cylinder 2) are formed in a main body portion 1 of the engine E. Pistons 3 are fittingly inserted in the respective cylinders 2 so as to be able to reciprocate. Floor portions of combustion chambers 4 are defined by top surfaces of the pistons 3. At ceiling portions of the combustion chambers 4 which portions are opposed to the top surfaces of the pistons 3, injectors 5 are provided such that tip end portions thereof face the respective combustion chambers 4. A high-pressure fuel is ejected from the tip end portions of the injectors 5.

Base end portions of the injectors 5 are individually connected through branch pipes 6a (FIG. 1 shows only one branch pipe 6a) to a common rail 6 provided commonly among the cylinders 2. A fuel pressure sensor 7 is provided at the common rail 6. A high pressure supply pump 9 is connected through a fuel supply pipe 8 to the common rail 6. The amount of fuel supplied from the high pressure supply pump 9 to the common rail 6 is controlled in accordance with a fuel pressure detected value detected by the fuel pressure sensor 7. With this, the fuel in the common rail 6 is maintained in a predetermined high pressure state.

A crank shaft 10 drivingly coupled to the pistons 3 by connecting rods are provided in a crank case of the engine E. An electromagnetic pickup type engine revolution sensor (crank angle sensor) 11 is provided in the crank case. The crank angle sensor 11 detects a rotation angle of a detected plate rotated integrally with the crank shaft 10, that is, a crank angle. An engine water temperature sensor 13 configured to detect a cooling water temperature of the engine E is provided so as to face a water jacket.

An intake passage 16 is provided at a right side of the engine E shown in FIG. 1. Air filtered by an air cleaner 15 is supplied through the intake passage 16 to the combustion chambers 4 of the cylinders 2. A surge tank 17 is provided at a downstream end portion of the intake passage 16. Passages branching from the surge tank 17 communicate with the combustion chambers 4 of the cylinders 2 through intake ports. An intake pressure sensor 18 configured to detect a pressure state of intake air and a supercharging pressure sensor 42 are provided at the surge tank 17.

A hot film air flow sensor 19, a compressor (rotating body) 20, an intercooler 21, and an intake shutter valve 22 are disposed on the intake passage 16 in this order from an upstream side toward a downstream side. The hot film air flow sensor 19 detects a flow rate of air (fresh air) taken into the engine E from outside. The compressor 20 is driven by a below-described turbine 27 to compress the intake air. The intercooler 21 cools the intake air compressed by the compressor 20. In the example of FIG. 1, the intake shutter valve 22 is positioned between a fully closed state and a fully opened state in such a manner that the magnitude of negative pressure acting on a diaphragm 23 is adjusted by an electromagnetic valve 24.

An exhaust passage 26 is provided at a left side of the engine E shown in FIG. 1. A burnt gas is discharged from the combustion chambers 4 of the cylinders 2 through the exhaust passage 26. An upstream end portion of the exhaust passage 26 is an exhaust manifold that branches for the cylinders 2 and communicate with the combustion chambers 4 through exhaust ports. On the exhaust passage 26 provided downstream of the exhaust manifold, the turbine (rotating body) 27 and a catalyst converter 28 are disposed in this order from the upstream side toward the downstream side. The turbine 27 receives an exhaust flow to rotate. The catalyst converter 28 can purify harmful components in an exhaust gas.

A turbocharger 30 constituted by the turbine 27 and the compressor 20 is a variable geometry turbo (VGT) configured such that: a plurality of movable flaps 31 are provided so as to surround an entire periphery of the turbine 27; and a communication cross-sectional area (nozzle cross-sectional area) for the exhaust gas to the turbine 27 is changed by the flaps 31. In the example of FIG. 1, the magnitude of negative pressure acting on a diaphragm 32 is adjusted by an electromagnetic valve 33, and the flaps 31 are rotated by an actuator. Further, a position sensor 43 configured to detect an opening degree of the flaps 31 based on a position of the actuator is provided. A turbo revolution sensor (detecting portion) 44 configured to detect the revolution of the compressor 20 is provided at the turbocharger 30.

An upstream end of a high pressure exhaust returning passage (hereinafter referred to as an "HP-EGR passage") 34 branches from and is connected to a portion of the exhaust passage 26 which portion is located at an exhaust upstream side of the turbine 27. A part of the exhaust gas is returned to an intake side through the HP-EGR passage 34. A downstream end of the HP-EGR passage 34 is connected to the intake passage 16 extending between the intake shutter valve 22 and the surge tank 17. A part of the exhaust gas taken out from the exhaust passage 26 before the exhaust gas flows through the turbine 27 is returned through the HP-EGR passage 34 to the intake passage 16. An exhaust return amount control valve (hereinafter referred to as an "HP-EGR valve") 35 capable of adjusting an opening degree is disposed on a downstream portion of the HP-EGR passage 34.

In FIG. 1, as with the intake shutter valve 22 and the flaps 31 of the turbocharger 30, the HP-EGR valve 35 operates in such a manner that the magnitude of negative pressure acting on a diaphragm is adjusted by an electromagnetic valve 36. The HP-EGR valve 35 continuously changes the passage cross-sectional area of the HP-EGR passage 34 to adjust the flow rate of the exhaust gas returned to the intake passage 16. To be specific, the HP-EGR passage 34 and the HP-EGR valve 35 constitute a high pressure exhaust returning unit configured to return a part of the exhaust gas of the engine E to an intake system. Further, as shown in FIG. 1, an upstream end of a low pressure exhaust returning passage (hereinafter referred to as an "LP-EGR passage") 37 branches from and is connected to a portion of the exhaust passage 26 which portion is located at an exhaust downstream side of a diesel oxidation catalyst (DOC) 28a and a diesel particulate filter (DPF) 28b. A part of the exhaust gas is returned to the intake side through the LP-EGR passage 37. Further, an exhaust shutter valve 29 is provided downstream of this branching and connected portion. A downstream end of the LP-EGR passage 34 is connected to the intake passage 16 extending between the hot film air flow sensor 19 and the compressor 20. A part of the exhaust gas taken out from the exhaust passage 26 after the exhaust gas flows through the turbine 27 is returned through the LP-EGR passage 37 to the intake passage 16. A filter 38, an EGR cooler 39, and an LP-EGR valve 46 capable of adjusting an opening degree are disposed on the LP-EGR passage 37. The adjustment of a return amount of the LP-EGR is performed by adjusting the opening degree of the exhaust shutter valve 29 and the opening degree of the LP-EGR valve 46.

Each of the injector 5, the high pressure supply pump 9, the intake shutter valve 22, the exhaust shutter valve 29, the turbocharger 30, the HP-EGR valve 35, the LP-EGR valve 46, and the like receives a control signal from an electronic control unit (hereinafter referred to as an "ECU") 40 to operate. The ECU 40 receives output signals from the fuel pressure sensor 7, the crank angle sensor 11, the engine water temperature sensor 13, the intake pressure sensor 18, the air flow sensor 19, and the like.

Further, the ECU 40 receives output signals from an accelerator opening degree sensor 41 configured to detect a stepping operation amount (accelerator opening degree) of an accelerator pedal, the supercharging pressure sensor 42 configured to measure the supercharging pressure, the position sensor 43 configured to detect the opening degree of the flaps 31, the turbo revolution sensor 44 configured to detect the revolution of the compressor 20, the engine revolution sensor 11 configured to detect the revolution of the engine E, and the like.

Abnormality Detection

In the present embodiment, the number of blades (vanes) of the compressor 20 constituting the turbocharger 30 is, for example, twelve. The turbo revolution sensor 44 detects the blades (detected portions) of the compressor 20 one by one, and one detected signal is formed into one square wave by a waveform forming circuit. Then, 128 square waves is output as one pulse by a frequency divider circuit. In this way, the load of a CPU is reduced. It should be noted that the turbo revolution sensor 44 may be a sensor configured to detect the blades of the turbine 27. In this case, the abnormalities of the blades of the turbine 27 can be detected.

Figure 2:
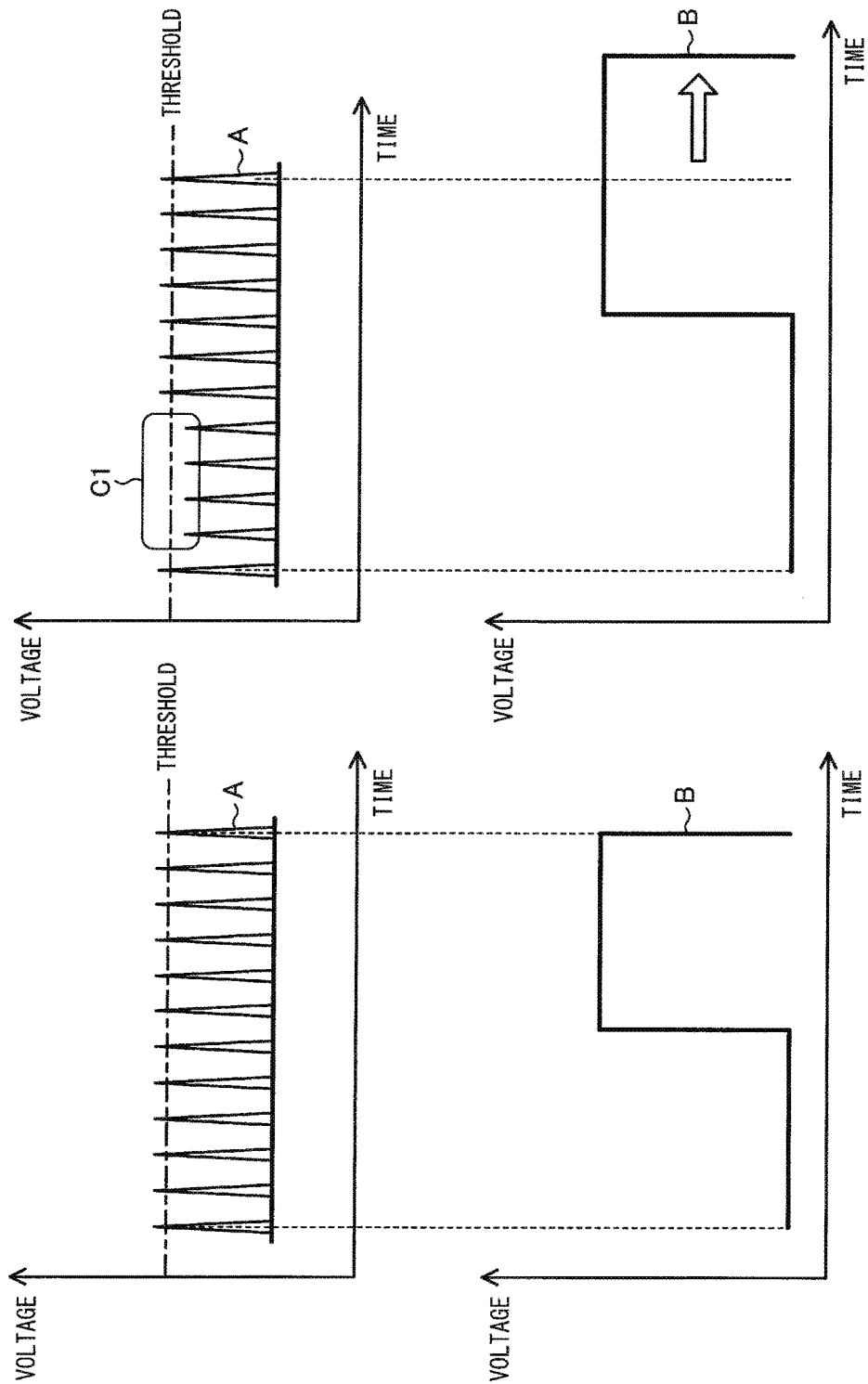
FIGS. 2A and 2B are graphs each showing an abnormality detecting method of the abnormality detector of the turbocharged engine according to one embodiment of the present invention.

FIG. 2A schematically shows output signals A from the turbo revolution sensor 44 and a voltage change B obtained after frequency division in a normal case. For ease of explanation, FIG. 2A shows that: all the twelve blades of the compressor 20 are normally detected; and data pieces corresponding to 128 blades are formed into one pulse. That the blades of the compressor 20 are normally detected by the turbo revolution sensor 44 denotes that: each of voltage values of the output signals A from the turbo revolution sensor 44 exceeds a predetermined threshold; and the voltage values each exceeding the threshold are input to a receiving circuit.

FIG. 2B schematically shows the output signals A from the turbo revolution sensor 44 and the voltage change B obtained after the frequency division in an abnormal case. In the example of FIG. 2B, each of the voltage values of four output signals A from the turbo revolution sensor 44 in a region C1 is lower than the threshold. Therefore, to complete the data pieces corresponding to 128 blades, data pieces corresponding to four more blades need to be received. Thus, the pulse is delayed by four blades as compared to the normal case, and the pulse width expands by four blades as compared to the normal case.

It should be noted that the output signal A from the turbo revolution sensor 44 does not reach the threshold when an interval between the blade of the compressor 20 and the turbo revolution sensor 44 exceeds an allowable range, that is, when the blade is damaged, for example.

Figure 3:
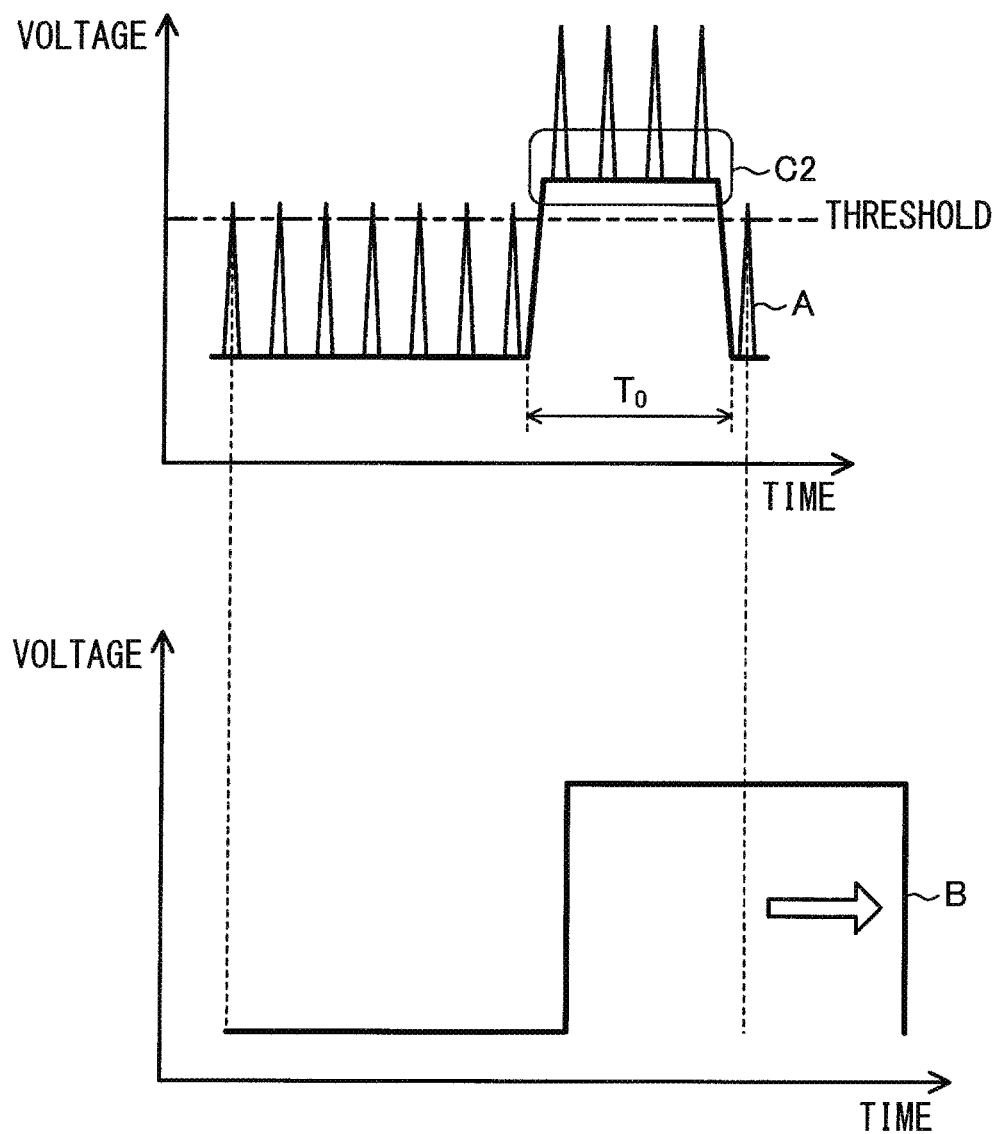
FIG. 3 is a graph showing the abnormality detecting method of the abnormality detector of the turbocharged engine according to one embodiment of the present invention and is a schematic graph showing another example of the sensor output signals and the pulse waveform obtained after the frequency division in the abnormal case.

FIG. 3 shows an abnormality when the output signals A from the turbo revolution sensor 44 shift to a high potential side in a predetermined period $T_0$ by an electromagnetic noise or the like. As shown in FIG. 3, in this case, in a region C2, data pieces corresponding to four blades disappear from the signals. Thus, the pulse is delayed by four blades as compared to the normal case, and the pulse width expands by four blades as compared to the normal case.

Control Method

A control method regarding an abnormality detection of the turbocharged engine according to the present embodiment will be explained in reference to FIGS. 4 to 6.

Figure 4:
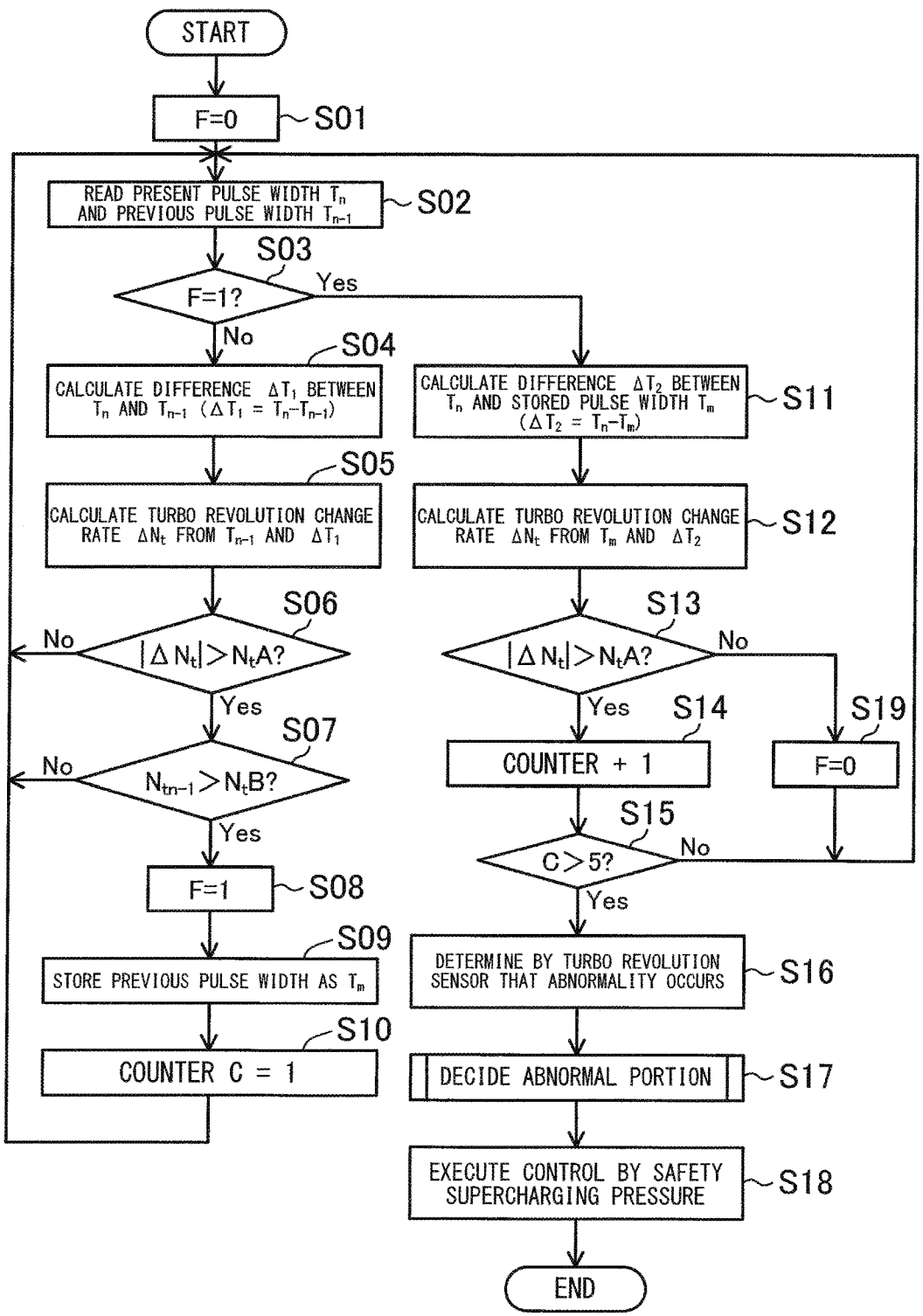
FIG. 4 is a flow chart showing the abnormality detecting method of the abnormality detector of the turbocharged engine according to one embodiment of the present invention.
Figure 5:
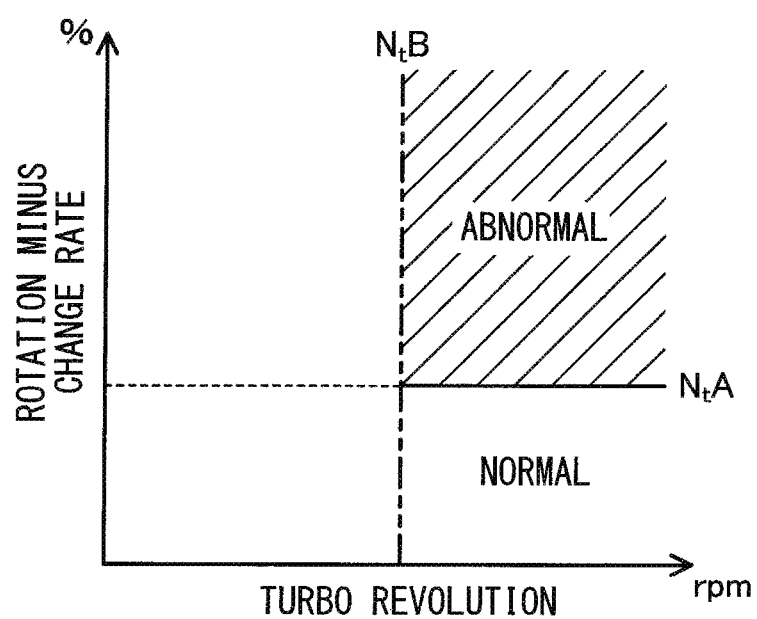
FIG. 5 is a graph for explaining a region in which an abnormality is detected by a compressor revolution and a compressor rotation change rate in the abnormality detector of the turbocharged engine according to one embodiment of the present invention.

FIG. 4 is a flow showing the abnormality detection of the turbocharged engine and a subsequent control method. As shown in FIG. 4, first, in Step S01, a flag F is initialized to zero indicating that a determination routine is performed for the first time.

Next, in Step S02, regarding the pulses B shown in FIGS. 2A, 2B, and 3, a pulse width Tn−1 of the previously detected pulse and a pulse width Tn of the presently detected pulse are read. Each compressor includes twelve blades, and the pulse width Tn is a signal width corresponding to 128 blades, so that when the abnormality such as the damage of the blade does not occur, the pulse width Tn (unit: seconds) is represented by Formula (1) below where Ntn (unit: rpm) denotes the revolution.

$$Tn=(1/Ntn)\cdot(128/12)\times 60 \quad (1)$$

Next, in Step S03, when the flag F is zero, the process proceeds to Step S04. When the flag F is one, the process proceeds to Step S11.

Next, in Step S04, a difference ΔT1 between the present pulse width Tn and the previous pulse width Tn−1 is calculated.

Next, in Step S05, a turbo revolution change rate (hereinafter referred to as a "rotation minus change rate") ΔNt is calculated from Formula (1) using the previous pulse width Tn−1 and the obtained difference ΔT1.

Next, in Step S06, whether or not an absolute value of the rotation minus change rate ΔNt exceeds a predetermined rotation minus change rate ΔNtA is determined. When the absolute value of the rotation minus change rate ΔNt does not exceed the predetermined rotation minus change rate ΔNtA, the process returns to Step S02. When the absolute value of the rotation minus change rate ΔNt exceeds the predetermined rotation minus change rate ΔNtA, the process proceeds to Step S07.

Next, in Step S07, whether or not a turbo revolution Ntn−1 calculated from the previous pulse width Tn−1 exceeds a predetermined revolution NtB is determined. When the previous turbo revolution Ntn−1 does not exceed the predetermined revolution NtB, the process returns to Step S02. When the previous turbo revolution Ntn−1 exceeds the predetermined revolution NtB, the process proceeds to Step S08.

Next, in Step S08, the flag F is set to one.

Next, in Step S09, the previous pulse width Tn−1 that is a reference of the present pulse width Tn from which an abnormality is detected is stored as an initial value Tm in a predetermined region of a memory circuit.

Next, in Step S10, the initial value that is one is set to a counter C. Thus, a first stage of the abnormality detection processing is completed by Steps S08 to S10 above.

One example of the processing including Steps S06 and S07 will be explained in reference to FIG. 5. As shown in FIG. 5, in Step S06, when the predetermined rotation minus change rate ΔNtA is, for example, 1%, and the absolute value of the rotation minus change rate ΔNt exceeds 1% of the turbo revolution, it is determined that the abnormality is detected. For example, when the turbo revolution Ntn−1 calculated from the previous pulse width Tn−1 is $2.0\times 10^5$ rpm, and the rotation minus change rate ΔNt exceeds 2,000 rpm, it is determined that the abnormality is detected. Further, when the turbo revolution Ntn−1 is $1.5\times 10^5$ rpm, and the rotation minus change rate ΔNt exceeds 1,500 rpm, it is determined that the abnormality is detected.

In Step S07, whether or not the turbo revolution Ntn−1 calculated from the previous pulse width Tn−1 exceeds the predetermined revolution NtB is determined. The compressor 20 tends to cause the abnormality when the rotation thereof is high as compared to when the rotation thereof is low. Further, while the rotation of the compressor 20 is relatively low, it tends to change in a short period of time. Therefore, in consideration of an effectiveness of the abnormality detection, the abnormality detection is performed in a region exceeding the predetermined revolution NtB.

Next, the process returns from Step S10 to Step S02 in FIG. 4. In Step S02, the pulse width Tn of the newly detected pulse is read.

Next, in Step S11, a difference ΔT2 between the present pulse width Tn and the stored pulse width Tm is calculated from Formula (1).

Next, in Step S12, the rotation minus change rate ΔNt is calculated from Formula (1) using the stored pulse width Tm and the obtained difference ΔT2.

Next, in Step S13, as with Step S06, whether or not the absolute value of the rotation minus change rate ΔNt exceeds the predetermined rotation minus change rate ΔNtA is determined. When the absolute value of the rotation minus change rate ΔNt does not exceed the predetermined rotation minus change rate ΔNtA, the process proceeds to Step S19. Then, the flag F is reset to zero, and the process returns to Step S02. When the absolute value of the rotation minus change rate ΔNt exceeds the predetermined rotation minus change rate ΔNtA, the process proceeds to Step S14.

Next, in Step S14, the value of the counter C is increased by one.

Next, in Step S15, whether or not the value of the counter C exceeds five is determined. When the value of the counter C does not exceed five, the process returns to Step S02.

When the value of the counter C exceeds five, the process proceeds to Step S16. It should be noted that "five" as the threshold of the counter C is one example and may be suitably changed.

Next, in Step S16, since the counter C exceeds five that is the threshold from which it is determined that the abnormality occurs, the determination of the abnormality by the turbo revolution sensor 44 is decided. In Step S16, whether the abnormality is the abnormality of the blade of the compressor 20 or the abnormality caused by the electromagnetic noise cannot be determined.

Next, in Step S17, an abnormal portion is decided. The decision of the abnormal portion is shown by the flow chart of FIG. 6.

Figure 6:
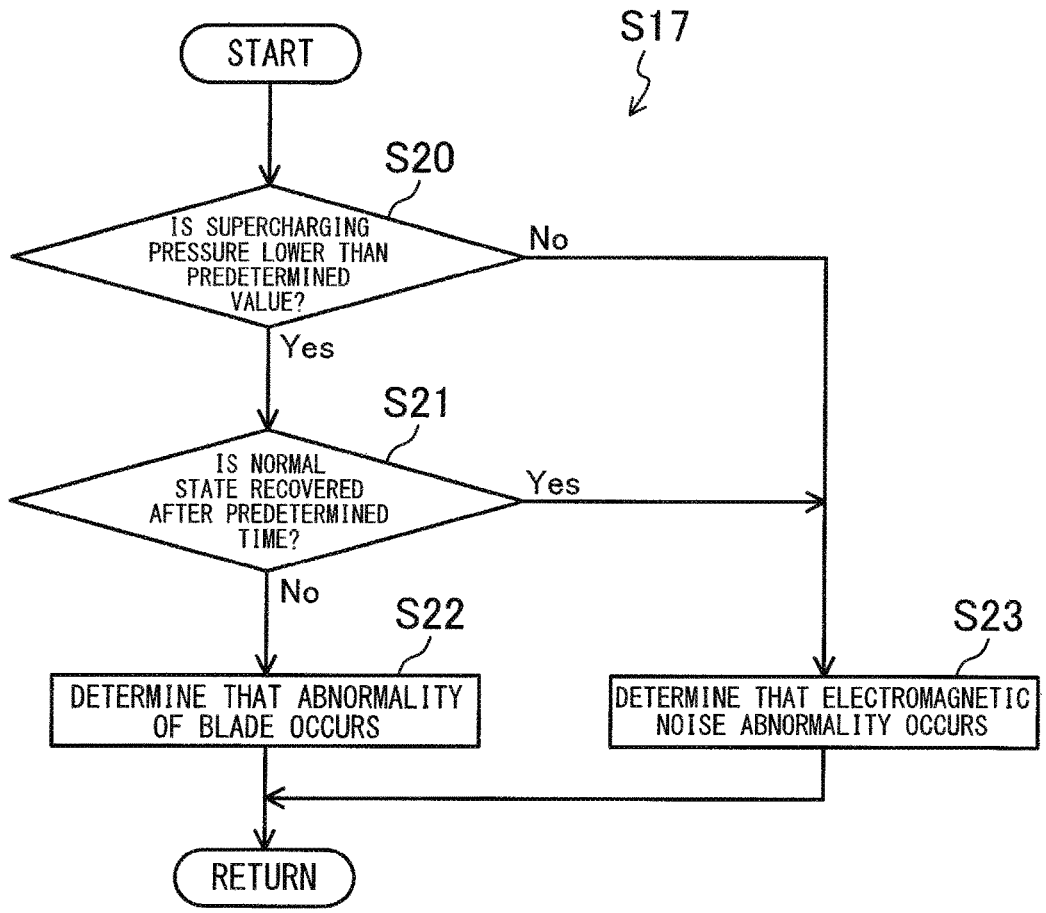
FIG. 6 is a flow chart showing a processing method of determining an abnormal portion in the abnormality detecting method of the abnormality detector of the turbocharged engine according to one embodiment of the present invention.

As shown in FIG. 6, first, in Step S20, whether or not the supercharging pressure output from the supercharging pressure sensor 42 is lower than a predetermined value that is a target value (designed value) is determined. When the supercharging pressure is equal to or higher than the predetermined value, the process proceeds to Step S23, and the abnormality is concluded as the abnormality caused by the electromagnetic noise. When the supercharging pressure is lower than the predetermined value, the process proceeds to Step S21.

Next, in Step S21, whether or not a normal state is recovered from an abnormal state after a predetermined time elapses is determined. When it is determined that the normal state is recovered, the process proceeds to Step S23, and the abnormality is concluded as the abnormality caused by the electromagnetic noise. When it is determined that the normal state is not recovered, the abnormality is concluded as the abnormality of the blade of the compressor 20. To determine whether or not the normal state is recovered from the abnormal state after the predetermined time elapses, the same process as Steps S02, S11, S12, and S13 in FIG. 4 may be performed after a timer is set to a desired time such as about several seconds, and the desired time elapses. Further, the determination in Step S13 may be performed after the loop of the same process as Steps S02, S11, and S12 is executed for a desired time. The execution order of Steps S20 and S21 may be reversed. Next, the process returns to the flow shown in FIG. 4.

Next, in Step S18 of FIG. 4, the supercharging pressure is set to a value lower than the target value (designed value). To be specific, the turbocharger 30 is controlled by safety supercharging pressure. The control by the safety supercharging pressure denotes, for example, supercharging pressure control in which the supercharging pressure is set to about 50 to 60% of the target value.

With this, the abnormality detection and control of the abnormality detector of the turbocharged engine according to the present embodiment are completed.

In the present embodiment, as one example of the engine E, the VGT (Variable Geometry Turbo) is used as the turbocharger. However, the present invention is not limited to the VGT.

Further, in the present embodiment, as one example of the engine E, the diesel engine is used. However, the present invention is not limited to the diesel engine and is applicable to a gasoline engine.

Effects

As above, according to the present embodiment, the detection signals obtained by detecting the blades of the turbine 27 or the compressor 20 as the rotating body are formed by frequency division into a pulse whose frequency is reduced. When it is determined that the rotation change of the rotating body which change is calculated based on the previously measured pulse width $T_{n-1}$ and the presently measured pulse width $T_n$ exceeds a predetermined rate (change rate) in a region where the revolution of the turbine 27 or the compressor 20 exceeds the predetermined revolution NtB (if necessary, such determination is performed plural times), it can be determined that the abnormality of the blade of the turbine 27 or the compressor 20 or the electromagnetic noise abnormality of the turbo revolution sensor 44 occurs. To be specific, in the detection of the abnormality of the rotating body, the detection of the rotation abnormality by the damage of the rotating body, the electromagnetic noise abnormality, or the like can be accurately performed while reducing the load of the CPU.

INDUSTRIAL APPLICABILITY

As explained above, the abnormality detector of the turbocharged engine according to the present invention is applicable to, for example, usages which need to accurately detect the rotation abnormality by the damage of the rotating body, the electromagnetic noise abnormality, or the like while reducing the load of the CPU of the electronic control unit.

LIST OF REFERENCE CHARACTERS

E engine
1 main body portion
2 cylinder
3 piston
4 combustion chamber
5 injector
6 common rail
6a branch pipe
7 fuel pressure sensor
8 fuel supply pipe
9 high pressure supply pump
10 crank shaft
11 engine revolution sensor (crank angle sensor)
13 engine water temperature sensor
15 air cleaner
16 intake passage
17 surge tank
18 intake pressure sensor
19 air flow sensor
20 compressor (rotating body)
21 intercooler
22 intake shutter valve
23, 32 diaphragm
24, 33, 36 electromagnetic valve
26 exhaust passage
27 turbine (rotating body)
28a diesel oxidation catalyst (DOC)
28b diesel particulate filter (DPF)
29 exhaust shutter valve
30 turbocharger
31 flap
34 high pressure exhaust returning passage
35 exhaust return amount control valve
37 low pressure exhaust returning passage
38 filter
39 EGR cooler
40 electronic control unit
41 accelerator opening degree sensor
42 supercharging pressure sensor 43 position sensor
44 turbo revolution sensor (detecting portion)
46 LP-EGR valve

The invention claimed is:

1. An abnormality detection system of a turbocharged engine, the abnormality detection system comprising:
a rotating body of the turbocharged engine including a plurality of blades;
a revolution sensor configured to electrically detect the plurality of blades, and each time the plurality of blades are detected a predetermined number of times, output one pulse having a pulse width corresponding to a measurement time required to detect the plurality of blades the predetermined number of times; and
a processor configured to:
calculate a revolution of the rotating body from the pulse width of the output pulse;
calculate a rotation change of the rotating body based on a pulse width of a first pulse and a pulse width of a second pulse output after the first pulse; and
when the rotation change exceeds a predetermined rate in a region where the revolution of the rotating body exceeds a predetermined revolution, determine that an abnormality of the blade or an electromagnetic noise abnormality of the revolution sensor occurs.

2. The abnormality detection system according to claim 1, wherein:
the rotating body is one of a turbine and a compressor which constitute the turbocharger;
when the rotation change of the rotating exceeds the predetermined rate, and supercharging pressure to the turbocharger decreases below a predetermined value, the processor is configured to determine that the abnormality of the blade occurs; and
when the rotation change of the rotating body exceeds the predetermined rate, and the supercharging pressure does not decrease below the predetermined value, the processor is configured to determine that the electromagnetic noise abnormality occurs.

3. The abnormality detection system according to claim 1, wherein the processor is configured to decide that the rotation change of the rotating body exceeds the predetermined rate when each of rotation changes of the rotating body, which changes are calculated by the processor based on the pulse width of the first pulse and pulse widths of a plurality of pulses consecutively output after the first pulse, exceeds the predetermined rate.

4. The abnormality detection system according to claim 3, wherein when the rotation change of the rotating body does not exceed the predetermined rate after the rotation change of the rotating body exceeds the predetermined rate, it is determined that the electromagnetic noise abnormality occurs.

* * * * *